(12) United States Patent
Henrie

(10) Patent No.: US 6,170,062 B1
(45) Date of Patent: Jan. 2, 2001

(54) FAULT DETECTION ON DUAL SUPPLY SYSTEM FOR A UNIVERSAL SERIAL BUS SYSTEM

(75) Inventor: James B. Henrie, Grayslake, IL (US)

(73) Assignee: 3Com Corporation, Santa Clara, CA (US)

( * ) Notice: Under 35 U.S.C. 154(b), the term of this patent shall be extended for 0 days.

(21) Appl. No.: 09/455,586

(22) Filed: Dec. 6, 1999

Related U.S. Application Data

(62) Division of application No. 08/918,013, filed on Aug. 25, 1997, now Pat. No. 6,000,042.

(51) Int. Cl.[7] ....................................................... G06F 1/28

(52) U.S. Cl. ................................ 713/340; 714/14; 714/47

(58) Field of Search ..................................... 713/300, 310, 713/340; 714/14, 25, 37, 40, 43, 47

(56) References Cited

U.S. PATENT DOCUMENTS

| | | | |
|---|---|---|---|
| 4,956,563 | * | 9/1990 | Schornack ............................... 307/66 |
| 5,315,533 | * | 5/1994 | Stich et al. ............................. 700/298 |
| 5,675,813 | | 10/1997 | Holmdahl . |
| 5,884,086 | | 3/1999 | Amoni et al. . |

OTHER PUBLICATIONS

Manuel entitled "Universal Serial Bus Specification" Revision 1.0; pp. 1–10, 217–268; Jan. 15, 1996.
Texas Instruments Manual entitled "TPS2014, TPS2015 Power Switches;" pp. 1–21; Aug. 1997.
Solectron Texas Blueprints (9 sheets); 1996–1997.
Texas Instruments Manual entitled "(EVM) Evaluation Module Documentation–TUSBEM 2140 (USB 4–Port Hub & I²C Interface)" (11 sheets); Aug. 1, 1997.
Logic Diagram for TUSB2040 (4 sheets).
Logic Diagram for TUSB2070 (5 sheets).
Solectron Texas Logic Diagram (5 sheets); Jul. 17, 1997.
Texas Instruments Manual entitled "SN75240 Dual Universal Serial Bus Port Transient Suppressor;" pp. 1–4; Feb. 1997.
Texas Instruments Manual entitled "TPS7101Q, TPS7133Q, TPS7148Q, TPS7150Q, TPS7101Y, TPS7133Y, TPS7148Y, TPS7150Y Low–Dropout Voltage Regulators;" pp. 1–14, 18–32; Jan. 1997.
Texas Instruments Manual entitled TPS2010, TPS2011, TPS2013, TPS2010Y Power–Distribution Switches; pp. 6–1 through 6–18; Aug. 1995.
Solectron Texas Blueprints (9 sheets); 1996–1997.
Texas Instruments Manual entitled "TUSB2140 Data Manual –4–Port Hub With an Embedded Function for the Universal Serial Bus;" pp. iii through B–2 (63 sheets); Nov. 1997.
Texas Instruments Manual entitled "TUSB2040 4–Port Hub for the Universal Serial Bus;" pp. 1–13; Aug. 1997.
Texas Instruments Manual entitled "TUSB2070 7–Port Hub for the Universal Serial Bus;" pp. 1–12; Aug. 1997.

(List continued on next page.)

*Primary Examiner*—Thomas M. Heckler
(74) *Attorney, Agent, or Firm*—McDonnell Boehnen Hulbert & Berghoff

(57) ABSTRACT

A method and apparatus for a dual power supply on a universal serial bus system using an overcurrent detect circuit. Dual power supplies in the universal serial bus system allows for greater flexibility of operation and is based on two separate power systems. The first power system is achieved using the power line on the bus connecting to the universal serial bus controller. The second power system is a separate power supply to power the downstream ports. Moreover, the universal serial bus system has an overcurrent and thermal error detect circuit based on the power system in order to achieve an efficient and cost effective method and apparatus in which to notify the universal serial bus controller of any error in the power system.

6 Claims, 14 Drawing Sheets

OTHER PUBLICATIONS

Intel brochure regarding USB Family Evaluation Board (2 sheets); 1998.

Intel Manual entitled "8×931HA USB Customer Hub Preliminary Datasheet;" pp. 1–12; Nov. 1997.

Intel Manual entitled "Advance Information –8×930Hx Universal Serial Bus Hub Peripheral Controller;" pp. iii–33; May 1997.

Cherry Electrical Products brochure regarding G80–3000HXMUS Keyboard; Aug. 29, 1997.

Belkin brochure regarding Express Bus™ Hub; undated.

CATC brochure regarding Andromeda™ USB Hub and Orion™ self–powered USB Hub; (2 sheets); undated.

National Semiconductor Manual entitled "USBN9602 (Universal Serial Bus) Full Speed Function Controller With DMA Support;" pp. 1–43; Nov. 1997.

"Micrel MIC2525 USB High–Side Power Switch Advance Information" (5 sheets).

"Micrel MIC2526 Dual USB High–Side Power Switch Advance Information" (6 sheets).

Solectron Texas Logic Diagram TUSBK7HUB (5 sheets).

Solectron Texas Logic Diagram TUSBK4HUB (4 sheets).

Solectron Texas Blueprint 9806020–001 C (2 sheets).

* cited by examiner

FAULT DETECTION ON DUAL SUPPLY SYSTEM FOR A UNIVERSAL SERIAL BUS SYSTEM This application is a division of 08/918013 filed Aug. 25, 1997 now U.S. Pat. No. 6,000,042.

BACKGROUND OF THE INVENTION

A. Field of the Invention

This invention relates to the operation of a communication network, and more particularly relates to a method and apparatus for powering components on the communication network.

B. Description of Related Art

The universal serial bus (USB) is a protocol for a serial bus. USB supports data exchange between a host computer and a wide range of simultaneously accessible peripherals. The attached peripherals share USB bandwidth through a host scheduled token based protocol. The USB allows peripherals to be attached, configured, used and detached while the host and other peripherals are in operation.

The USB transfers signal and power over a four wire cable with two wires for power (+5 Volts) and ground and the other two wires for data signaling. The USB in one configuration is 12 megabits per second and supports up to 128 devices. One of the purposes behind the universal serial bus is to provide ease of use to add PC peripherals. The USB is designed to handle a broad range of devices such as telephones (both analog, digital, and proprietary), modems, printers, mice, joysticks, scanners, keyboards, and tablets. Therefore, removed from the personal computer are the parallel, serial, graphics, modem, sound/game and mouse ports. The USB is designed so that external devices, such as a mouse or a keyboard may be correctly detected and properly configured upon attachment. Ordinarily, the topology of the USB system is tiered star. At each star is a universal serial bus repeater providing power for the devices, routing of signals in each direction and providing terminations for each line.

The universal serial bus repeater is a device which has one upstream port, a universal serial bus controller, and several downstream ports. The upstream port is toward the host, such as connected to a computer or other data communication device, and the downstream ports is toward a device. The universal serial bus controller performs the following functions: routing of the signals from the upstream port to the downstream ports and from the downstream ports to the upstream port; and error detection and recovery. The universal serial bus controller supports two power source modes (bus-powered or self-powered). Ordinarily, if the power required for the downstream ports and embedded functions is equal to or less than the power the bus can supply, the universal serial bus controller can be powered by the bus. If the power required for the downstream ports and embedded functions is more than what the bus can supply, the universal serial bus controller and the downstream ports are self-powered.

When the universal serial bus controller is self powered, the operator of the system must follow a special sequence in configuring the system. The operator must first connect the power source for the universal serial bus controller and the downstream ports. Then, the operator must connect the universal serial bus controller to the port on the computer. Otherwise, if the bus is connected to the universal serial bus controller without the universal serial bus controller being powered, the computer may determine that there is a problem with the universal serial bus controller since the computer detects that the universal serial bus controller is connected, but it is not responding due to a lack of power. Thus, the sequence of connecting the power supply and then the connector to the bus must be followed to avoid any potential errors.

Further, all self-powered universal serial bus controllers should implement overcurrent and thermal error protection for safety reasons. The universal serial bus controller should have a way to detect faults in the system such as an overcurrent or thermal error condition and report it to the universal serial bus software. Should the aggregate current drawn by a single downstream port or group of downstream ports exceed a preset value or the thermal value of the power supply be too high, the power should be removed from the downstream ports and the condition should be reported through the universal serial bus controller to the computer. Fault detect circuits, detecting overcurrent and thermal errors, are used to protect from catastrophic device failures, software errors that turn on devices when the current budget has been exceeded, and operator actions such as shorting out the connector pins. Known overcurrent limiting methods include poly fuses, standard fuses, or a solid state switch.

Moreover, the power supply which supplies power to the universal serial bus controller and the downstream ports in the self-powered mode are designed either with expensive power switches such as power transistors or switching chips. In this manner, the power which is supplied by the power supply can be turned on upon power up or turned off when an overcurrent is detected. Also, the power can be turned on or turned off by the software on the computer through the universal serial bus controller, which is contained within the universal serial bus controller.

Finally, when the universal serial bus controller and the downstream ports are in the self-powered mode, this limits the overall operation of the system. In the event of an overcurrent thermal error or other condition which requires the power supply to be removed, the power to the universal serial bus controller is removed as well. Thus, in order to have a reliable universal serial bus system, the power to the universal serial bus controller and the downstream ports should be reliable. It would therefore be desirable to have an improved method and apparatus for powering components on the communication network.

SUMMARY OF THE INVENTION

In accordance with a first aspect of the invention, a universal serial bus apparatus is provided. The universal serial bus apparatus has a universal serial bus controller which is connected to a first power source. The universal serial bus controller is also connected to at least one downstream port, the downstream port receiving power from a second power source. The universal serial bus apparatus also includes an overcurrent detect circuit.

In accordance with a second aspect of the invention, a method of powering a universal serial bus controller and at least one port downstream of the universal serial bus controller is provided. The universal serial bus controller has one power source and the at least one port downstream of the universal serial bus controller has a second power source separate from the first power source. The method includes the step of connecting the universal serial bus controller to the first power source. Moreover, the method includes the step of checking the connection to the universal serial bus controller to determine that the universal serial bus controller is connected and is powered. The method also includes the step of connecting the second power source to the at least one downstream port. And, the method includes the step of powering the at least one downstream port via the second power source, the powering of the at least one downstream port being done after connecting the universal serial bus controller to the bus, powering the universal serial bus controller, and connecting the second power source to the at least one downstream port.

In accordance with a third aspect of the invention, a universal serial bus apparatus is provided. The universal serial bus apparatus has a universal serial bus controller, a first power source, a second power source, and a first means for determining whether the first power source or the second power source powers the universal serial bus controller, the first means connected to the first power source and the second power source.

In accordance with a fourth aspect of the invention, a method of powering a universal serial bus controller and at least one port downstream of the universal serial bus controller is provided. The method includes powering a universal serial bus controller with a first power source. The method further includes powering at least one downstream port which is connected to the universal serial bus controller with a second power source. And, the method includes switching the power to the universal serial bus controller from the first power source to the second power source when the voltage on the first power source is less than a predetermined value.

In accordance with a fifth aspect of the invention, a fault detect system for a power supply apparatus is provided. The fault detect system has a power supply, the power supply having a line which outputs the fault status of the power supply, the line also inputting a value to turn the power supply on or off. The fault detect system also has a fault detect circuit, with the fault detect circuit including a means for determining if there is a fault on the power supply, the means for determining being connected to the line on the power supply. The fault detect circuit further includes means for turning the power supply on or off, the means for turning the power supply on or off also being connected to the line on the power supply.

In accordance with a sixth aspect of the invention, a method for determining the fault on a power supply is provided. The method includes the step of sensing a line on the power supply to determine the fault status on the power supply. The method further includes the step of determining whether there is a fault on the power supply. And, the method includes the step of turning off the power supply by sending a signal to the power supply on the same line on the power supply.

In accordance with a seventh aspect of the invention, a compound universal serial bus apparatus is provided. The compound universal serial bus apparatus includes a universal serial bus controller, an upstream port which is connected to the universal serial bus controller, at least one downstream port which is connected to the universal serial bus controller, an external device which is connected to the universal serial bus controller, a power supply connected to the at least one downstream port for supplying power to the at least one downstream port and a fault detect circuit connected to the universal serial bus controller for indicating an error to the universal serial bus controller.

Accordingly, a primary object of the invention is to provide the universal serial bus controller with a fault detect circuit.

Another object of the invention is to provide an overcurrent and thermal error circuit to the universal serial bus controller using the circuitry of the power supply.

Another object of the invention is to maintain normal operation of the universal serial bus controller in the event of an overcurrent or thermal error condition or other catastrophic failure from the power supply.

A further object of the invention is to remove power from the power supply in an inexpensive manner in the event of an overcurrent condition or other catastrophic failure from the power supply.

Yet a further object of the invention is to make the fault detect circuitry easy to manufacture and reliable.

Still yet a further object of the invention is to provide a redundant power supply for the universal serial bus controller and the downstream ports.

Still yet another object of the invention is to provide a compound universal serial bus repeater with a fault detect circuit.

These and other objects, features, and advantages of the present invention are discussed or apparent in the following detailed description.

BRIEF DESCRIPTION OF THE DRAWINGS

A presently preferred embodiment of the present invention is described herein with reference to the drawings wherein:

FIG. 2 is a block diagram of the switching power supply in FIG. 1a;

FIG. 3 is a block diagram of the fault detect circuit in FIG. 1a;

FIG. 5 is a circuit diagram of the universal serial bus controller in FIG. 1a;

FIG. 7 is a circuit diagram of the voltage regulator in FIG. 1a;

FIG. 8b is a circuit diagram for changing the power source for the universal serial bus controller as shown in FIG. 8a;

FIG. 8c is a circuit diagram for changing the power source for the downstream ports as shown in FIG. 8a;

FIG. 8d is a circuit diagram for turning off the power source to the downstream ports as shown in FIG. 8a;

FIG. 9b is a block diagram of the downstream port supporting an embedded device as shown in FIG. 9a.

DETAILED DESCRIPTION OF THE PREFERRED EMBODIMENTS OF THE INVENTION

Figure 1A:
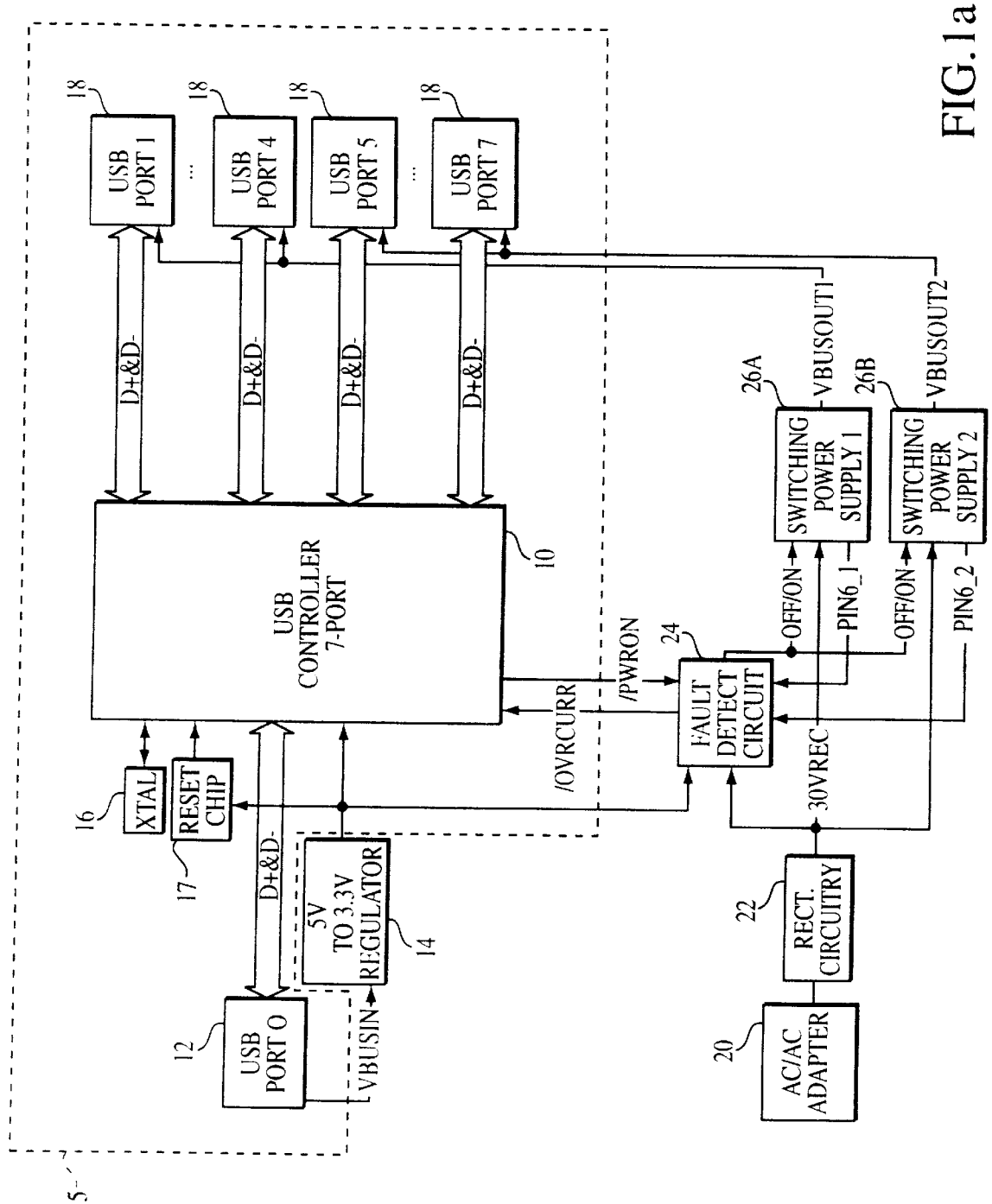
FIG. 1a is a block diagram of a self-powered universal serial bus controller with a plurality of downstream ports, a switching power supply, a fault detect circuit, and a voltage regulator.

FIG. 1a shows the architecture of a universal serial bus repeater 5 which includes a universal serial bus controller 10 connected to a number of outside ports. The universal serial bus controller 10 controls the routing of the signals from the upstream port to the downstream ports and from the downstream ports to the upstream port and error detection and recovery. Universal Serial Bus (USB) Port 0 (12) is the universal serial bus upstream port which is typically connected to a host computer. Universal Serial Bus Ports 1 to 7 (18) are universal serial bus downstream ports which are typically connected to universal serial bus devices. D+ and D− signify signals which are sent to and from both the upstream and downstream ports. At the connection to the universal serial bus port 0 (12), there is a 5 Volt bus voltage signified as VBUSIN. The VBUSIN voltage is input to the 5V to 3.3V Regulator 14, with the output of the regulator being sent to power the universal serial bus controller 10, the fault detect circuit 24, and the power-on reset circuit 17 (i.e., resetting the controller during power-up) (shown in FIG. 5). The universal serial bus controller 10 also has a crystal input (XTAL) 16 which operates at 48 MHz for purposes of timing.

The AC/AC adapter 20 is supplied with power from a typical wall outlet. The output of the AC/AC (20) adapter is 20 Volts AC which is input to a rectifier 22. The output of the rectifier 22 is 30V rectified which is used to power two switching power supplies 26A, 26B and used as an input to the fault detect circuit 24, described hereinafter. The two switching power supplies 26A, 26B switch the rectified 30V input to 5VDC to power the downstream ports 18. In the event that four ports or less are needed downstream of the universal serial bus controller 10, only one switching power supply 26A is necessary. In an alternative embodiment, a single high current switching power supply may be used in place of the two switching power supplies 26A, 26B to power all seven downstream ports. The fault detect circuit 24 connects to the universal serial bus controller 10 and the two switching power supplies 26A, 26B.

Figure 3:
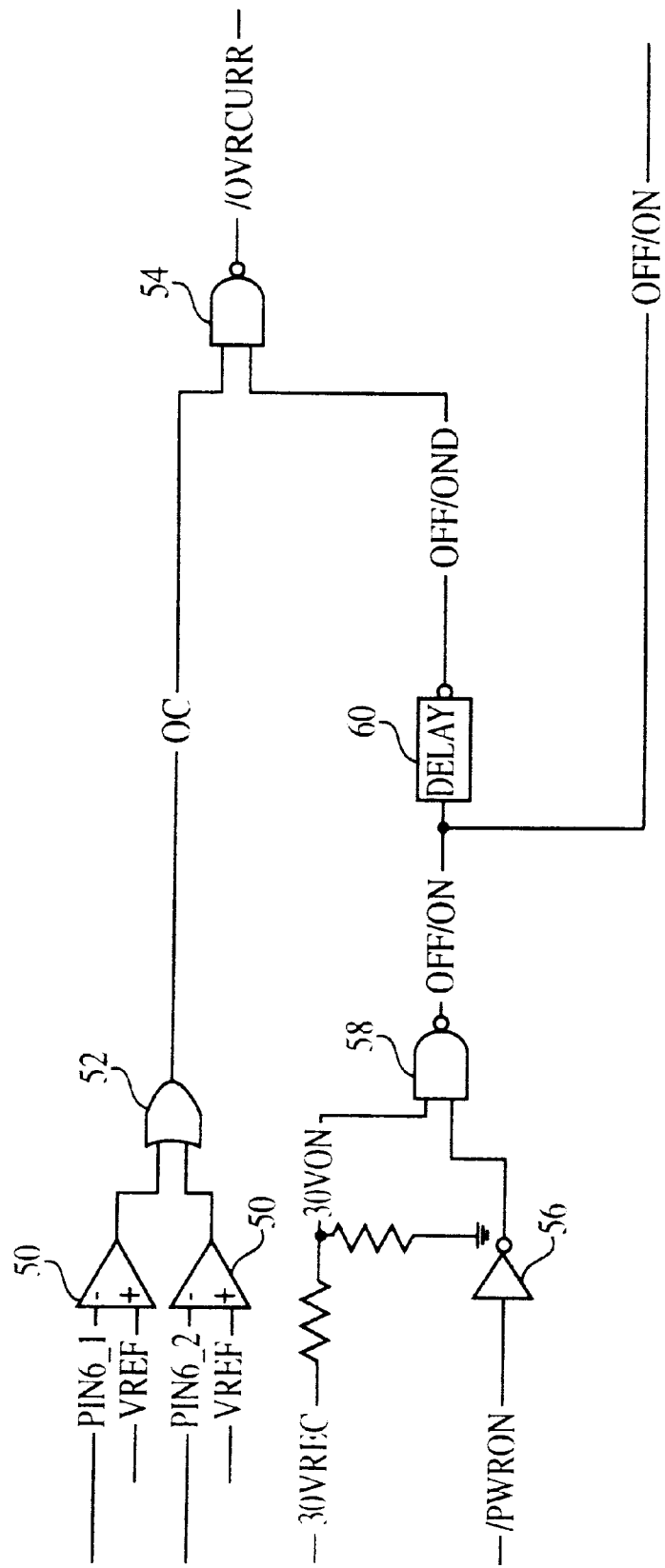
Figure 4:
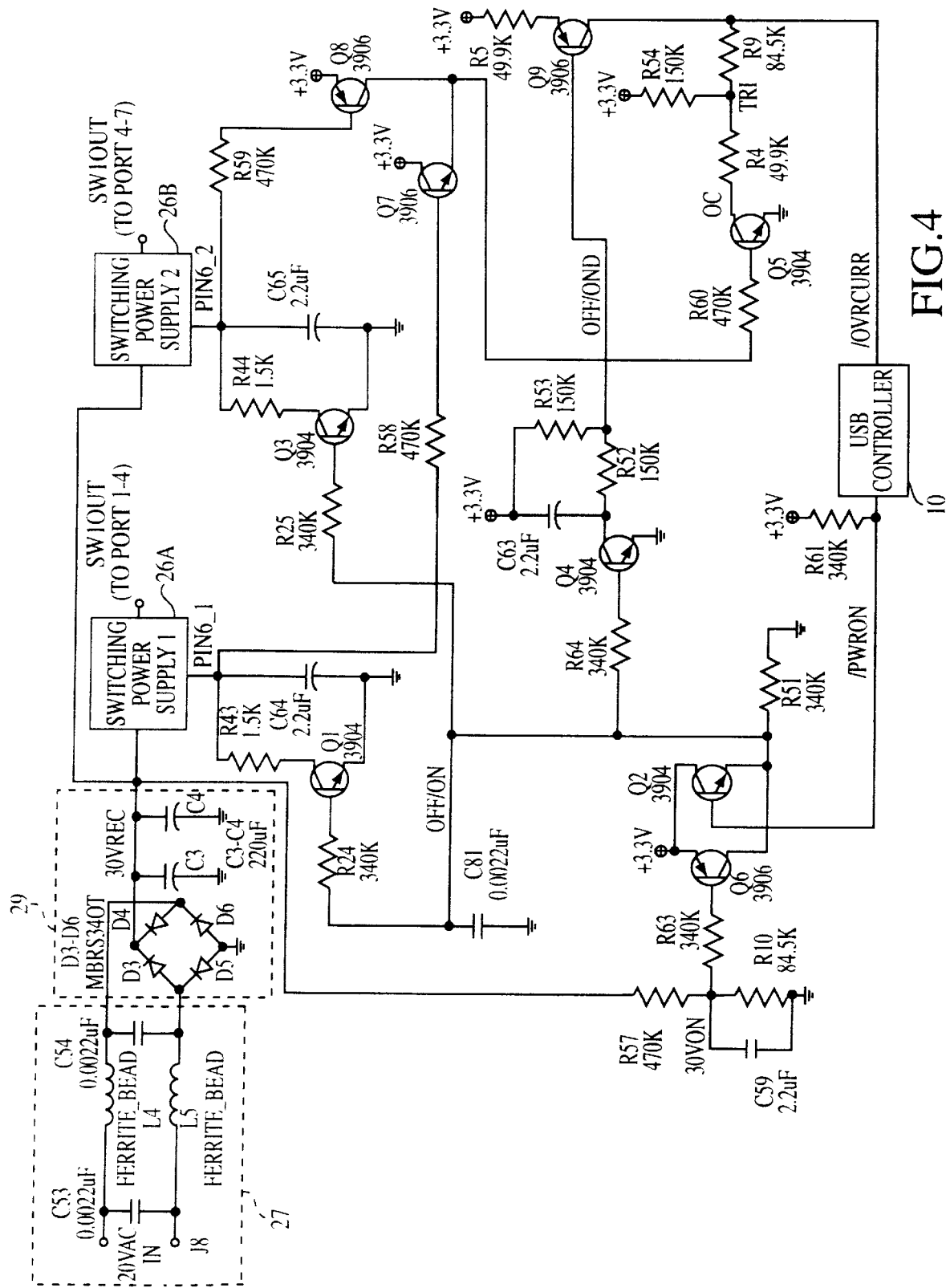
FIG. 4 is a circuit diagram of the circuitry in the fault detect circuit in FIG. 3.
Figure 7:
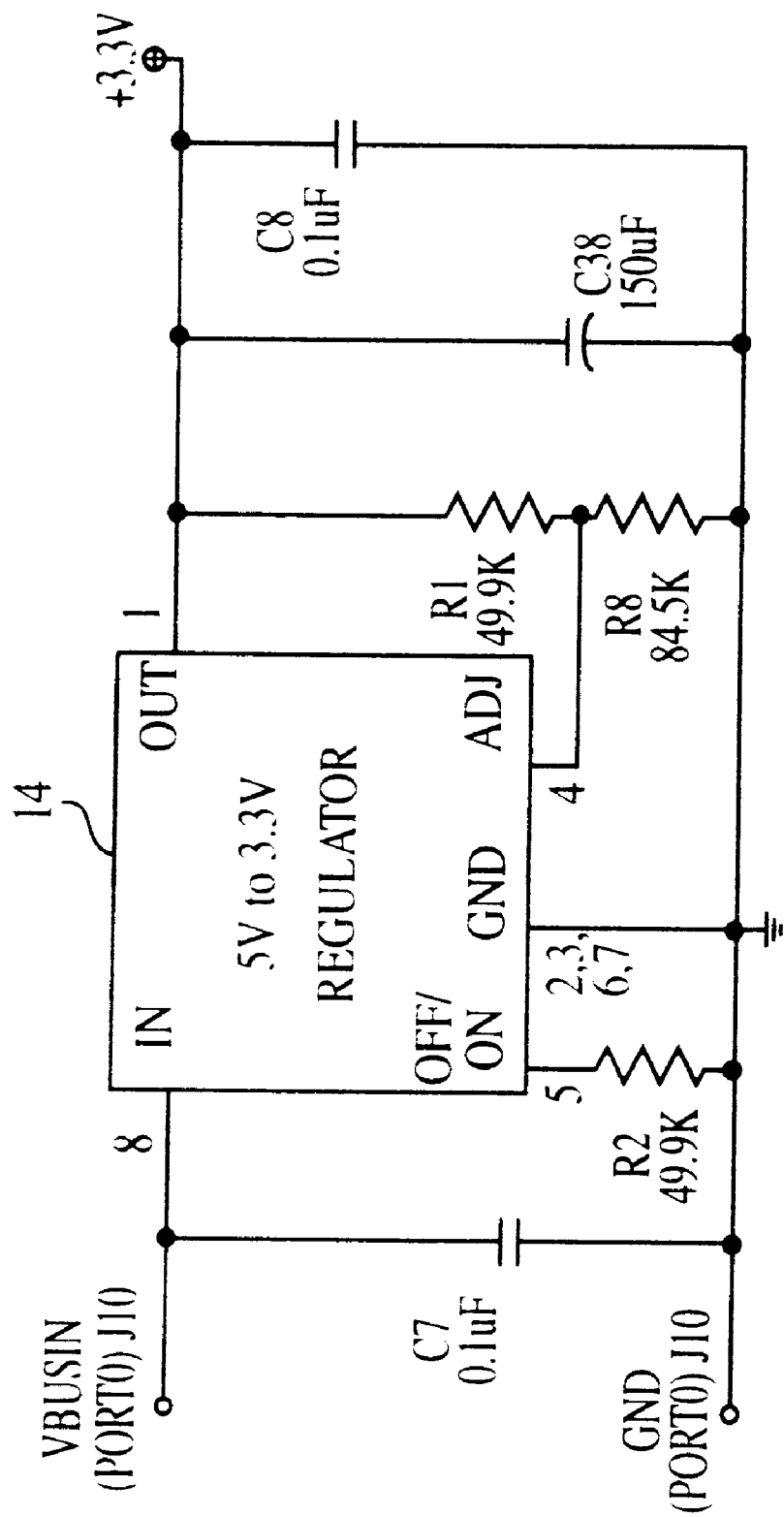

In an alternative embodiment, the AC/AC adapter 20 is replaced with an AC/DC adapter. The AC/DC adapter is supplied with power from a typical wall outlet and provides 5VDC at 4 Amps. In addition, the Switching Power Supplies 26A and 26B are replaced by a linear regulator, similar to the regulator as shown in FIG. 7 except with higher current capabilities and with an ON/OFF switch. The fault detect circuit, as shown in FIG. 3, with the OFF/ON output is inverted and connected to the ON/OFF switch of the linear regulator. In particular, the fault detect circuit is modified so that R59, as shown in FIG. 4, is changed from connection to pin6_2 to the connection to the 5V OUT of the linear regulator (pin 1 of the linear regulator). A resistor is added from the transistor side of R59, as shown in FIG. 4, to ground, providing a voltage driver to measure the voltage out of 5V OUT.

The configuration, as shown in FIG. 1a, allows for the universal serial bus controller 10 to have power independent from the downstream ports 18. So that, in the event of a failure in the AC adapter or in the switching power supplies 26A, 26B, the power to the universal serial bus controller 10 remains unaffected. Because of this method of powering the universal serial bus controller 10, the user can plug in either the cable connector to port 0 or the AC/AC adapter 20 first. Thus, the sequence of requiring the AC power to be connected first is eliminated.

In an alternative configuration, some of the downstream ports 18 may be powered by VBUSIN via connection, through a relay. The limitation on the number of downstream ports powered by VBUSIN depends on the power requirements of the downstream ports. Typically, VBUSIN can support a maximum current of five loads. If the total load requirement for the universal serial bus controller 10 and the selected downstream ports 18 is equal to or less than five loads, the power supplied for the downstream ports 18 can be divided between VBUSIN and switching power supplies 26A, 26B.

Figure 1B:
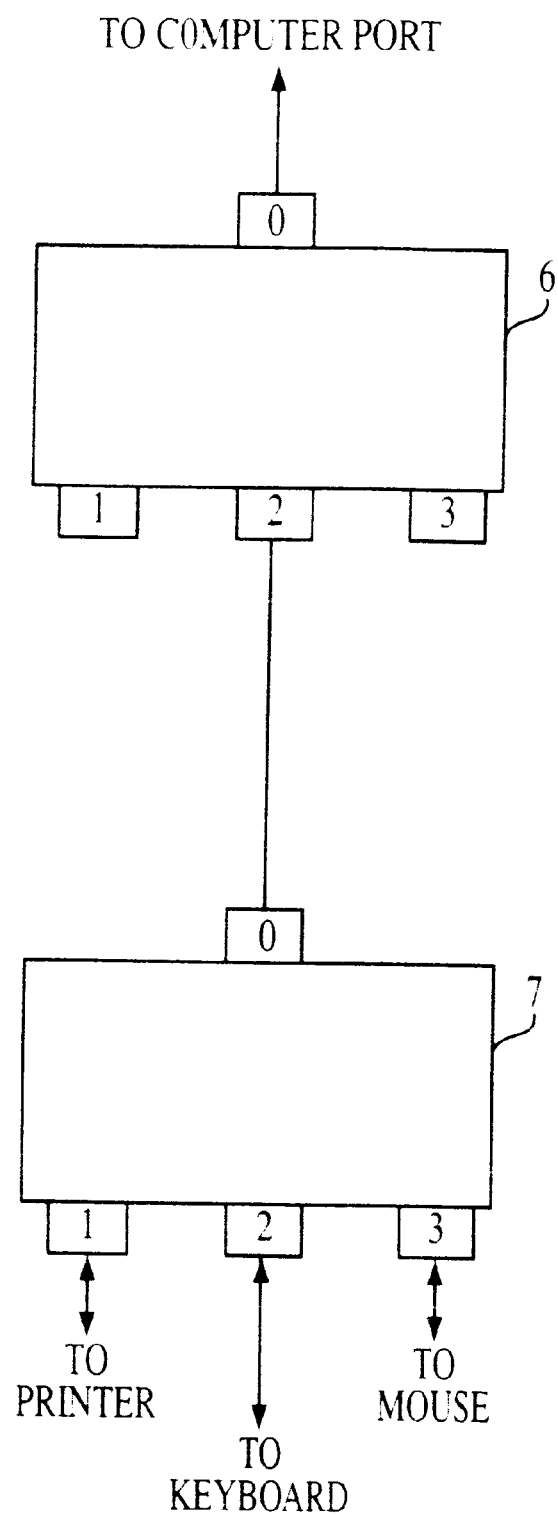
FIG. 1b is a block diagram of the connectivity of universal serial bus repeaters.

Referring to FIG. 1b, there is shown a block diagram of the connectivity of universal serial bus repeaters. Repeater 6 has an upstream port which is connected to a computer. Repeater 6 also has three downstream ports, with port 2 connected to the upstream port of Repeater 7. Repeater 7 has three downstream ports, which in one embodiment may be connected to a printer, keyboard and a mouse.

Figure 2:
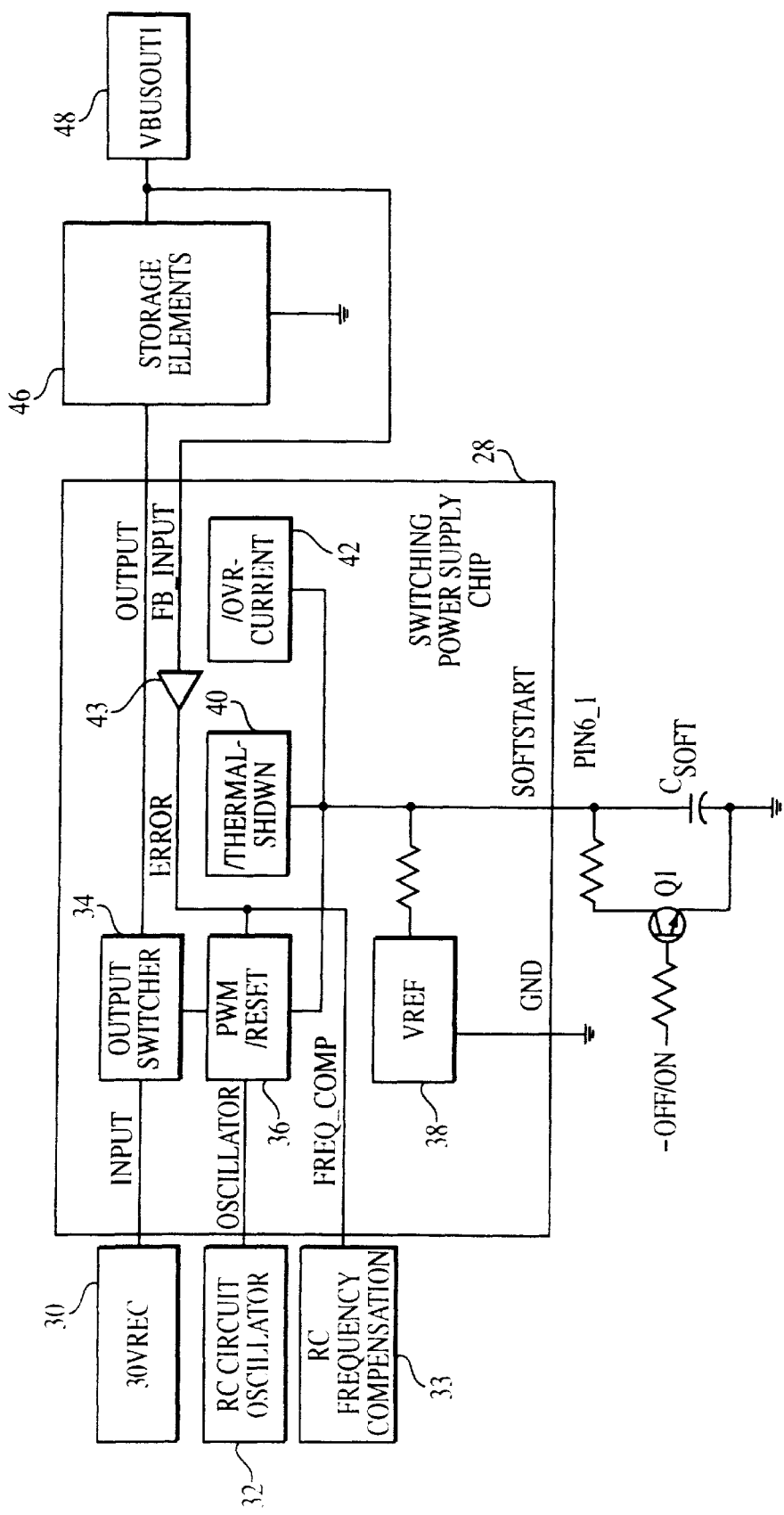
Figure 6:
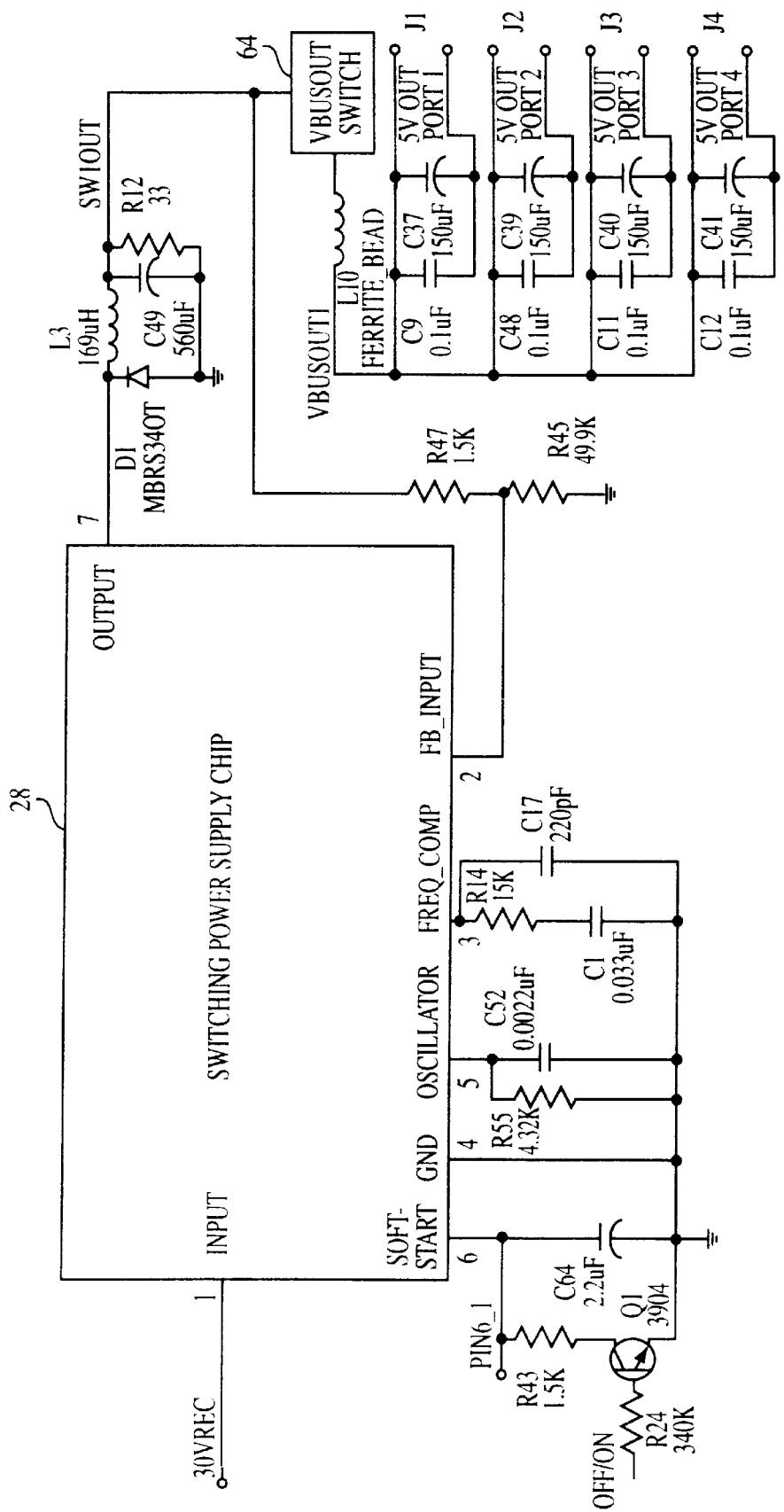
FIG. 6 is a circuit diagram of the circuitry in the switching power supply in FIG. 2.

Referring to FIG. 2, there is shown a block diagram of a switching power supply chip 28 for either of the switching power supplies 26A, 26B. The switching power supply chip 28 is current limited and thermally protected. The switching power supply chip 28 also has an external soft start pin (pin6_1) connected to the reset of the pulse width modulator (pwm) 36, an overcurrent detect 42 and a thermal shutdown 40. In this manner, the soft start pin (pin6_1) indicates the operation of the switching power supply 26A in various modes of operation, including indicating the fault status of the switching power supply 26A. For example, during power up of the switching power supply chip 28, this soft start pin (pin6_1) is designed to go from low to high with the time constant from the external capacitor $C_{soft}$. This slowly turns on the pulse width modulator 36 to allow the storage elements to charge up without drawing too much current. If the soft start pin (pin6_1) goes low for any reason, then the pulse width modulator reset (pwm) 36 is disabled and Vout 48 is turned off. A transistor (Q1 as shown in FIGS. 2, 4 and 6) is added to the soft start pin (pin6_1) to turn on and off the switching power supply 26A. In alternative embodiments, the transistor is replaced by a relay, any other type of switching device, or any device to drive the soft start pin high or low.

When the transistor Q1 is turned on, the soft start pin changes from 5V to about 0V. The pulse width modulator 36 is reset, shutting off Vout 48. Alternatively, for switching power supplies with an On/Off pin, that pin may be used to turn the power supply on or off instead of using transistor Q1. Moreover, in an alternative embodiment, the switching power supply chip 28 tests for other fault conditions on the switching power supply chip 28, including testing for undervoltage and overvoltage at its output. During instances of undervoltage or overvoltage, the switching power supply chip 28 signifies an error.

Moreover, if the switching power supply chip 28 detects either an overcurrent or an over temperature, the voltage level at the soft start pin (pin6_1) goes low, or about 1.5 V. When the soft start pin voltage goes low, the pulse width modulator 36 inside the switching power supply chip 28 is reset, shutting down the power to the downstream ports 18. If the overcurrent or the over temperature conditions are removed, the voltage level of soft start pin (pin6_1) goes high and normal operations resume. The fault detect circuit 24 uses the soft start pin (pin6_1) in order to determine when the switching power supply 26A has had an overcurrent or a thermal error. Using the soft start pin (pin6_1) in the fault detect circuit 24 to detect an overcurrent condition eliminates expensive components to measure the current of Vout 48 in the switching power supply 26A. In this manner, the design of fault detect circuit 24 and the switching power supply chip 28 allow for a reduced pin configuration. The soft start pin (pin6_1) is used both as an input and as an output. For example, the soft start pin is used for sensing the status of the switching power supply chip 28 and for turning on/off the switching power supply chip 28. This input/output use allows for easier manufacture and higher reliability.

Referring to FIG. 3, there is shown a block diagram of the fault detect circuit 24 shown as a block in FIG. 1*a*. The fault detect circuit 24 is used to protect against catastrophic device failures, software errors that turn on devices when the current budget has been exceeded, and user actions such as shorting out the connector pins. The fault detect circuit 24 determines whether there has been a change in the condition of the switching power supplies 26A, 26B. In order to do this, two comparators 50 are used. The inputs to the two comparators 50 are: pin6__1 and pin6__2 which are connected to the soft start pin of each of the switching power supplies 26A, 26B; and VREF which is set to about 3 Volts. When a voltage at the soft start pin goes low (which is about 1.5 Volts), the output of the corresponding comparator 50 changes from low to high. The outputs of the two comparators 50 are thereafter logically ORed together. Thus, if the voltage at either switching power supply soft start pin (pin6__1 or pin6__2) goes low, the corresponding comparator 50 goes high and the output of the OR gate 52 is high. Other means for determining if there is a fault on the power supply include using a switch, such as a transistor switch. When the soft start pin goes low, which is input to the switch, the switch turns off. Further, when the soft start pin goes high, the switch turns on. In addition, other means for determining if there is a fault on the power supply include circuitry which uses the soft start pin as an input, such as a logic circuit.

Four conditions cause the voltage at the soft start pin (pin6__1) on the switching power supply chip 28 to go low: (1) no AC power; (2) the universal serial bus controller 10 turned off the switching power supply chip 28; (3) an overcurrent was detected; or (4) a thermal shutdown occurred. The first two conditions are false overcurrent conditions and should not be reported to the universal serial bus controller 10. The last two conditions are true overcurrent conditions and must cause an overcurrent to be reported to the universal serial bus controller 10. The universal serial bus controller 10 then reports an overcurrent condition to the host computer through port 0 (12).

In order to indicate to universal serial bus controller 10 the two true overcurrent conditions, there are two additional inputs to the fault detect circuit 24. First, the 30VON, which is the output of the rectifier 22, indicates to the fault detect circuit 24 when the AC/AC adapter 20 is plugged in. Second, the /PWRON input to the fault detect circuit 24 is output from the universal serial bus controller 10. It indicates whether the universal serial bus controller 10 has turned on or off the power to the downstream ports 18. /PWRON indicates that the line is active low so that it must be inverted through an inverter 56.

The conditions under which an overcurrent or a thermal error occurs is when the AC/AC adapter 20 is plugged in and when the downstream ports 18 are turned on. Therefore, the 30VON and the /PWRON are NANDed together using a NAND gate 58 to form the OFF/ON signal. The OFF/ON signal is delayed through a delay circuit 60 to give the soft start capacitor $C_{soft}$ a chance to charge up and forcing the /OVRCURR line signal high, thus preventing a false overcurrent while powering on the switching power supplies 26A, 26B. The delayed output of the OFF/ON line is then NANDed using a NAND gate 54 with the output of the comparators 50 to form the /OVRCURR signal. /OVRCURR is an input to the universal serial bus controller 10 and is used to report an over current condition. In this manner, /OVRCURR indicates when there is an overcurrent or a thermal error to the universal serial bus controller 10 at the proper time.

The OFF/ON line signal is used to turn on and off the Switching Power Supplies 26A, 26B. The 30VON (AC power on) and /PWRON (from the universal serial bus controller 10) are NANDed together to generate the signal that turns on and off the Switching Power Supply 26A through Q1 (and Switching Power Supply 26B through Q3). As described above, the switching power supply 26A may be turned on by allowing the soft start pin to go high (pin6__1). However, the switching power supplies 26A, 26B should be turned on only when both the AC power and the power to the downstream ports 18 are turned on.

In the event of an overcurrent condition, the switching power supplies 26A, 26B must be turned off. The switching power supply chip 28 turns off the output of the switching power supply chip (Vout) in the event of an overcurrent or thermal error. Other means by which to limit the current include poly fuses, standard fuses, or some other type of solid state switch.

The switching power supply chip 28 may be turned off by driving the soft start pin (pin6__1) low. The transistor Q1 (See FIGS. 2, 4 or 6) may drive the soft start pin (pin6__1) low thereby turning off the output of the switching power chip 28. The switching power supply chip 28 for switching power supply 26A can be turned on by allowing the soft start pin (pin6__1) to go high using the transistor Q1. This circuitry eliminates the need to use an expensive FET or transistor to turn on or off the high current Vout. This transistor also allows for an inexpensive switching power supply to be used, rather than a switching power supply with an ON/OFF pin. Other means, in addition to transistor Q1, to turn on or off the switching power supply chip 28 include using any other type of switch. Any number of downstream ports 18 may be integrated into the fault detect circuit 24.

Referring to FIG. 4, there is shown a circuit diagram of the fault detect circuit 24. The output of AC/AC wall adapter 20 (as shown in FIG. 1*a*) is plugged into connector J8. This AC/AC wall adapter 20 converts the standard 120 VAC to 20 VAC up to 1.5 A. Because the wall adapter 20 is current limited, no fuse is needed. After connector J8, the 20 VAC passes through a pie filter 27 to reduce the noice. The pie filter 27 consists of two capacitors C53, C54 and two inductors L4 and L5. The 20 VAC then passes through a full bridge rectifier 29. The full bridge rectifier 29 consists of four diodes D3, D4, D5, D6 and capacitors C3 and C4. The diodes D3–D6 convert the negative portion of the 20 VAC sine wave to a positive portion, and the capacitors C3 and C4 add filtering, resulting in a 30 V input to the switching power supplies 26A and 26B. The switching power supplies 26A and 26B switch this voltage down to 5 V at 2 A to provide power to the downstream ports 18, shown in FIG. 1*a*. Switching power supply 26A provides 2A to downstream ports 1 to 4 and switching power supply 26B provides 2A to downstream ports 5 to 7.

Transistors in the fault detect circuit 24 reduce the current consumption to below 100 $\mu$A. The fault detect circuit 24 may be used on any configuration for a universal serial bus controller 10, with any number of ports regardless of the number of downstream ports. The four port universal serial bus repeater uses fewer components that the seven port universal serial bus repeater. The four port universal serial bus repeater circuit can be made from the seven port universal serial bus repeater circuit by deleting the following parts: switching power supply 26B, transistors Q3, Q8, resistors R59, R44, R25, and capacitors C4, C65. The universal serial bus controller draws power from port 0 via the 5 Volt to 3.3 Volt regulator 14. Capacitor C81 reduces potential noise on OFF/ON which may be sent to the switching power supplies. Moreover, resistor R24 is added to limit the current.

The following is a list of parts by manufacturer and part number for the fault detect circuit: Q1, Q2, Q3, Q4, Q5 (3904 transistor by National Semiconductor, model number MMBT3904); Q6, Q7, Q8, Q9 (3906 transistor by National Semiconductor, model number MMBT3906); D3, D4, D5, D6 (diodes by Diodes, Inc., model number SK34); C59, C63, C64, C65 (2.2 $\mu$F capacitor by AVX, model number TAJS225K010R); C3, C4 (220 $\mu$F capacitor by Nichicon, model number UPL1J221MHH6); C53, C54, C81 (0.0022 $\mu$F capacitor by AVX, model number 08051C222JATMA); R24, R25, R51, R61, R63, R64 (340 K$\Omega$ resistor by NIC, model number NRC06F3403TR); R43, R44 (1.5 K$\Omega$ resistor by NIC, model number NRC06152JTR); R57, R58, R59, R60 (470 K$\Omega$ resistor by NIC, model number NRC06474JTR); R9, R10 (84.5 K$\Omega$ resistor by NIC, model number NRC06F8452TR); R4, R5 (49.9 K$\Omega$ resistor by NIC, model number NRC06F4992JTR); R52, R53, R54 (150 K$\Omega$ resistor by NIC, model number NRC06F1503TR); L4, L5 (inductor by Murata Erie BLM31P500SPT); J8 (connector by Technical Devices, model number D-0202); AC/AC wall adapter 20 by Ault, model number TS7201500A010G.

The fault detect circuit 24 may be modified so that the connection to R59 is changed from connection to pin6_2 (the soft start pin (pin6_2) of switching power supply chip 26B) to connection to the 5V OUT of the switching power supply chip 26B. A resistor is added from the transistor side of R59 to ground, providing a voltage divider to measure the voltage out of 5V OUT. If the switching power supply (26A or 26B) has an overcurrent, 5V OUT will drop to about 1V. Likewise, the connection to R58 may be changed from its connection to pin6_1 to the connection to the 5V OUT of the switching power supply chip 26A. Moreover, the circuitry (Q1, R43 and R24; Q3, R44 and R25) to turn either switching power supply 26A or 26B on and off may be replaced by a switching power supply 26A or 26B with an ON/OFF pin. The inverted OFF/ON output from the fault detect circuit 24 is connected directly to the switching power supply ON/OFF pin. Further, logic gates rather than transistors can be used to implement the fault detect circuit 24 as shown in the block diagram in FIG. 3. These logic gates could be implemented in discrete parts or in an application specific integrated circuit chip (ASIC).

Figure 5:
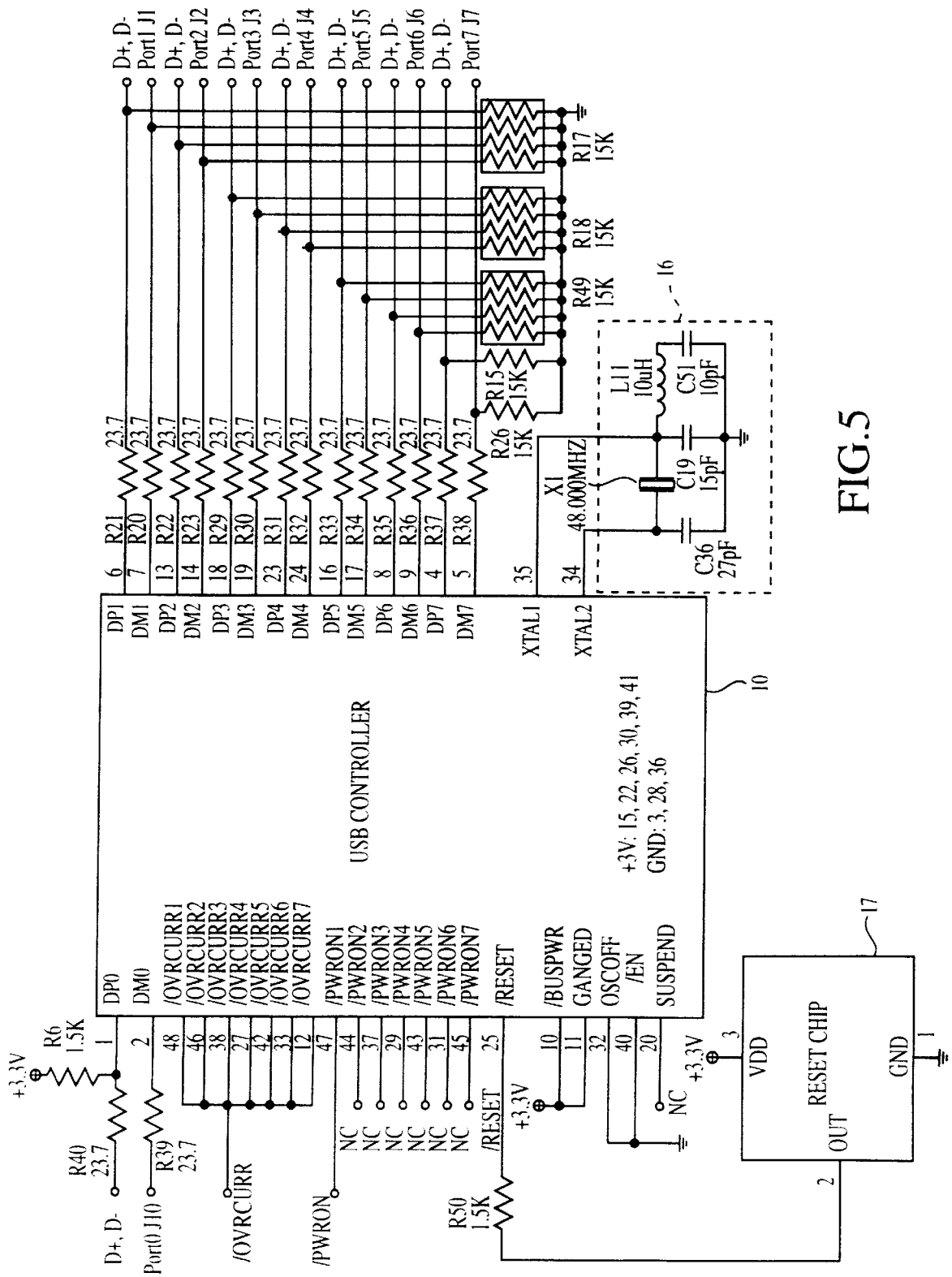

Referring to FIG. 5, there is shown a circuit diagram for the universal serial bus controller 10. The universal serial bus controller 10 has as inputs and outputs: data lines D+ and D− at pins 1 and 2 from universal serial bus port 0 (12) (port 0 is bi-directional); overcurrent inputs (pins 12, 27, 33, 38, 42, 46, and 48 of the universal serial bus controller 10) for each of the seven downstream ports which are connected to the output of the overcurrent circuit as shown in FIGS. 3 and 4; /RESET (pin 29) which is connected to a reset chip 17, manufactured by Seiko Instruments, model number S-80728AL-AR;/BUSPWR input (pin 10 of the universal serial bus controller 10) which receives the input power from the 5V to 3.3V regulator 14 or receives an alternative power input as described in FIGS. 8a, 8b, and 8c; and crystal input and output (pins 34 and 35 of the universal serial bus controller 10 for the output and input, respectively). The inputs and outputs for the universal serial bus controller 10 include: the data lines for the seven downstream ports (pins 6, 7, 13, 14, 18, 19, 23, 24); and the /PWRON pin (pin 47) to turn on or off power to the downstream ports, which is used by the fault detect circuit in FIGS. 3 and 4.

Referring to FIG. 6, the switching power supply 26A is shown. Power is input from the 30 V rectified and filtered voltage to the input of the switching power supply chip 28. The switching power supply chip 28, as described previously, has a soft start pin (pin6_1) which turns the switching power supply chip 28 on and off and which indicates whether an overcurrent or a thermal error has occurred. The soft start pin (pin6_1) is pulled either low or allowed to go high based on the state of the transistor Q1.

The switching power supply chip 28 is preferably an SGS-Thompson L4960 chip with heat sink. The switching power supply 26A supplies each downstream port 18 with up to 500 mA of current. As shown in FIG. 6, the switching power supply 26A supplies power to up to four downstream ports (e.g., ports 1–4). Further, FIG. 6 also has a VBUSOUT switch 64, which is described subsequently with respect to FIGS. 8a and 8c.

As shown in FIG. 2, the RC circuit oscillator 32 is connected to the switching power supply chip 28. In FIG. 6, the RC circuit from the RC circuit oscillator 32 includes a resistor, R55 and a capacitor C52. Other connections to the switching power supply chip 28 include the 30V rectified input connected to pin 1, the RC Frequency Compensation 33, as shown in FIG. 2, connected to pin 3, and the output at pin 7. As shown in FIGS. 3 and 4, pin6_1 is connected to the fault detect circuit 24. Storage elements 46 includes inductor L3, diode D1, capacitor C49 and resistor R12. FB_INPUT (pin 2 of the switching power supply chip 28) is connected to voltage divider R47 and R45. The FB_INPUT provides feedback to the switching power supply chip 28 as to the actual voltage at the output. If the output voltage goes below/above 5 V, the feedback directs the switching power supply chip 28 to provide more/less current for the correct voltage. Because the design of the system should provide 5 V at the output ports, and because of resistance in the cables and the drop in voltage across inductor L10, the output voltage from the switching power supply chip 28 should be designed to be slightly higher than 5 V. The voltage divider R47 and R45 accomplishes this by having the switching power supply chip 28 output a slightly higher voltage than 5 V at pin 7.

A universal serial bus repeater that is capable of supporting 7 ports downstream is manufactured by Texas Instruments, model number TUSB2070. A universal serial bus repeater that is capable of supporting 4 ports downstream is manufactured by Texas Instruments, model number TUSB2040.

Referring to FIG. 7, there is shown a circuit diagram of the 5 Volt to 3.3 Volt regulator 14. The 5 volt input is taken from port 0 (12, as shown in FIG. 1a) and input to pin 8 of the voltage regulator 14, manufactured by National Semiconductor, model number LM2931. The output of the voltage regulator 14, pin 1, sends the 3.3 Volts to pin 10 of the universal serial bus controller 10. ADJ (pin 4 of the 5V to 3.3 Volt regulator 14) is connected to resistors R1 and R8 which act as a voltage divider. This connection provides feedback to the regulator 14 to ensure that the output voltage is 3.3 V.

Figure 8A:
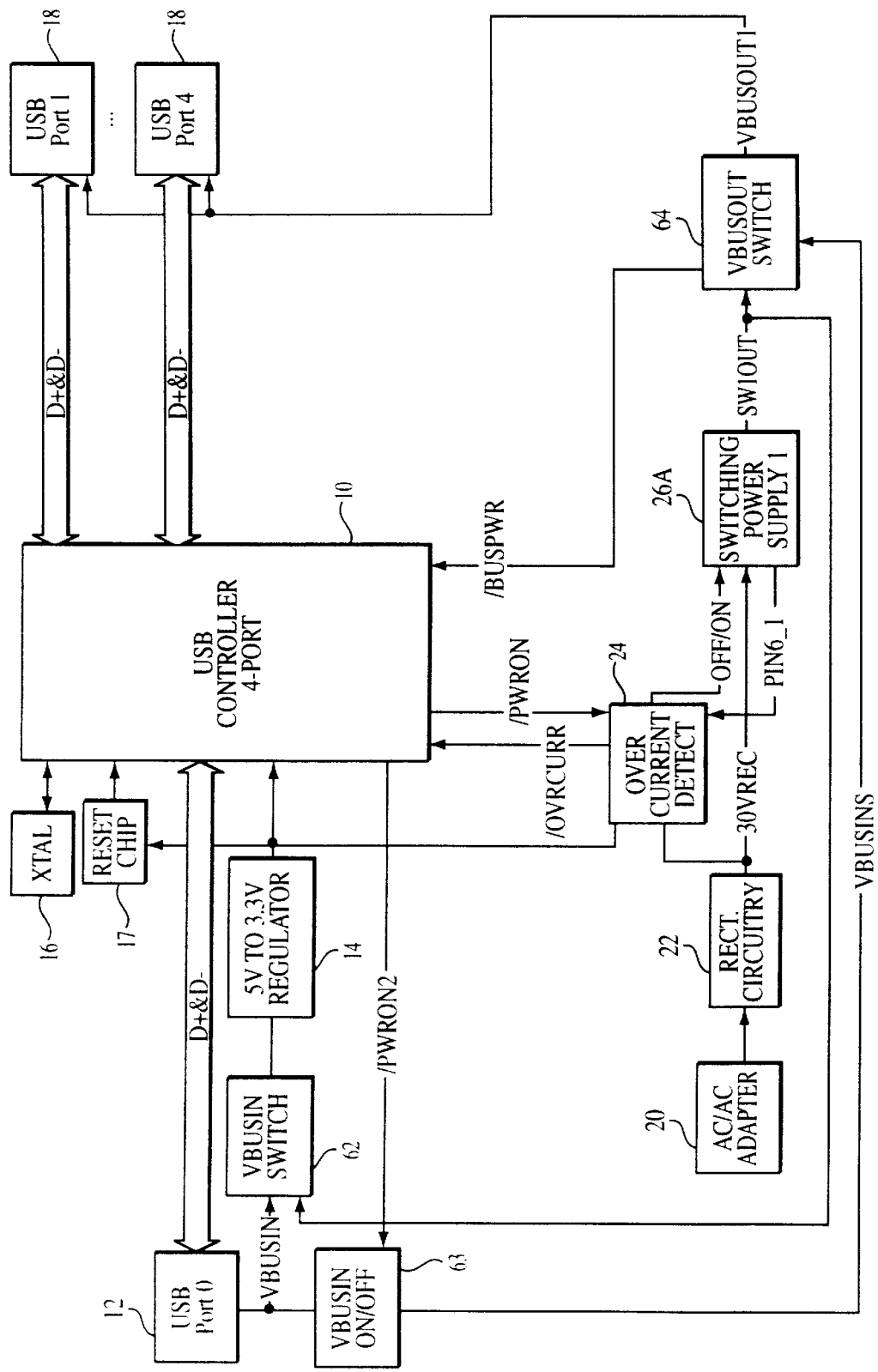
FIG. 8a is a block diagram of a self-powered universal serial bus controller with four downstream ports with circuitry for changing the power source for the universal serial bus controller and the downstream ports.

Referring to FIG. 8a, there is shown a block diagram of a universal serial bus repeater with four downstream ports 18. The configuration of FIG. 8a is similar to FIG. 1a with the addition of circuitry to switch the source of power for the universal serial bus repeater and the downstream ports. In particular, VBUSIN SWITCH 62 determines the selection of the power source for the universal serial bus controller 10 and VBUSOUT SWITCH 64 determines the selection of the power source for the downstream ports 18. SW1OUT is the output for the switching power supply 26A which is sent both to VBUSIN SWITCH 62 and VBUSOUT SWITCH 64.

Figure 8B:
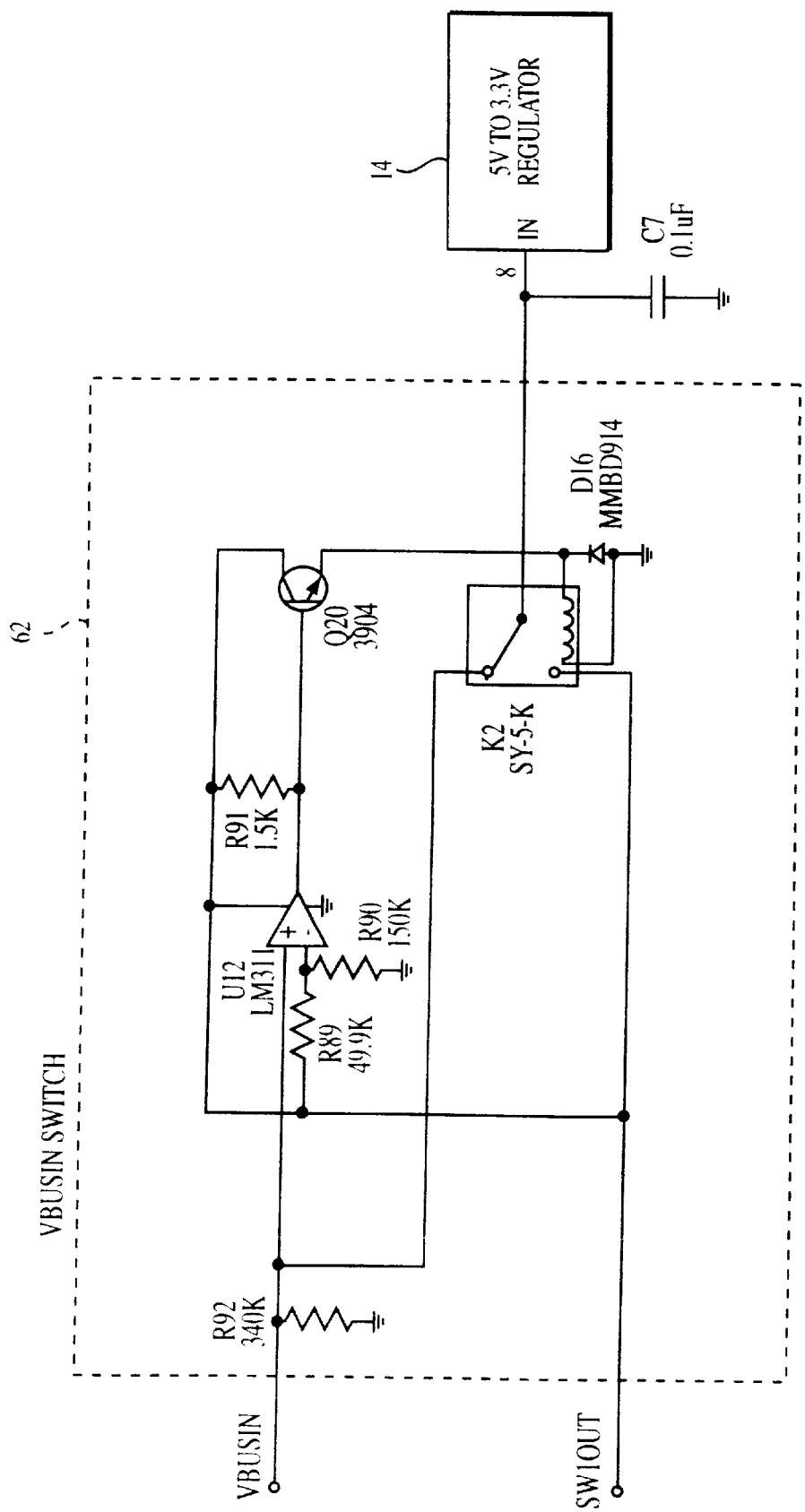

Referring to FIG. 8b, there is shown a circuit diagram for VBUSIN SWITCH 62. In order to increase the reliability of the universal serial bus controller 10, the power supplied to the universal serial bus controller 10 must be reliable. In order to ensure reliability, the input to the universal serial bus controller 10 must at least be a certain voltage level. In accordance with a preferred embodiment, if the input voltage falls below a certain level, the input voltage is switched to an alternate source. Comparator U12 has as inputs VBUSIN and a reference voltage. The reference voltage is determined based on the voltage at SW1OUT (which is 5 V) and the resistors R89 and R90. If VBUSIN drops below the reference voltage, Q20 is turned on, which in turn switches relay K2 so that the power to the 5V to 3.3 V regulator 14 is switched from VBUSIN to SW1OUT. In alternative embodiments, the relay is replaced by a transistor or any other type of switching device.

For example, if the current draw on VBUSIN exceeds normal parameters, VBUSIN may be unable to maintain sufficient voltage to power the universal serial bus controller 10. In that event, alternate means of powering the universal serial bus controller 10 may be used, such as SW1OUT. Further, in the event that power is not available on SW1OUT, the switch to SW1OUT is not made. Additionally, the reference voltage for the input of the comparator may be chosen by varying the values of R89 and R90 depending on the needs of the circuit. In an alternative embodiment, the primary means for power is obtained from the switching power supply 26A through SW1OUT. In this manner, when SW1OUT is unable to maintain sufficient voltage to power the universal serial bus controller 10, the power source is switched to the alternate means of power, which in this embodiment is VBUSIN. Thus, depending on the design parameters of the system, the system is designed for maximum reliability. Other means for determining if power should be switched include using a switch, such as a transistor switch. When the SW1OUT goes low, which is input to the switch, the switch turns off. Further, when the SW1OUT goes high, the switch turns on.

Figure 8C:
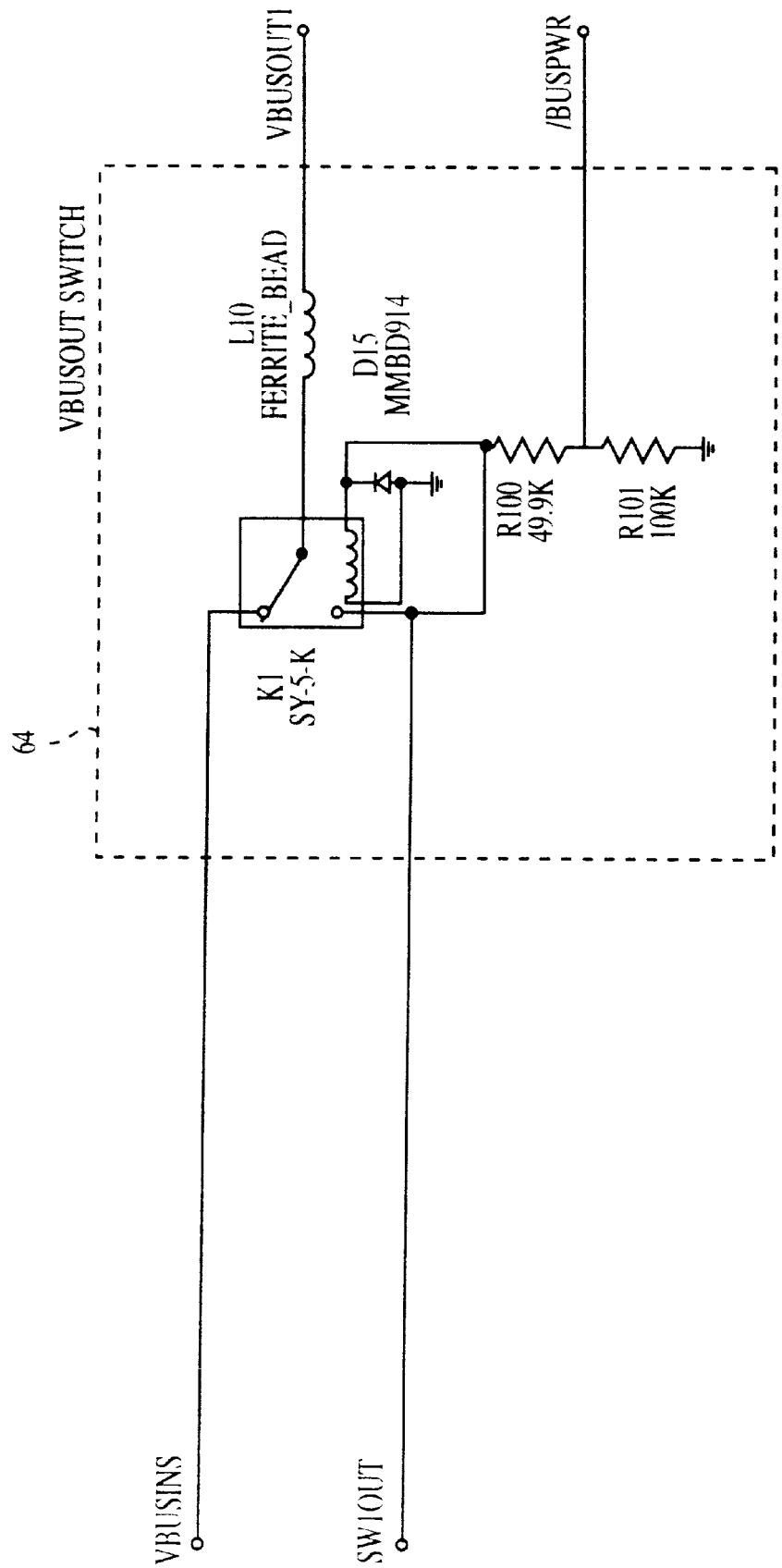

Referring to FIG. 8c, there is show a circuit diagram for VBUSOUT SWITCH 64 for switching the power supplied to the downstream ports in the event of a failure in the switching power supply 26A. Similar to the power system for the universal serial bus controller 10 as shown in FIG. 8b, redundancy in the power system for the downstream ports 18 increases reliability. In the event of a failure in the switching power supply 26A (e.g., an overcurrent or a thermal error) shown in FIG. 8a, the power supplied to the downstream ports 18 may be switched so that the VBUSINS (which is described subsequently with respect to FIG. 8d) powers the downstream ports 18. Under normal operation, SW1OUT is at 5 V so that the relay switch K1 connects SW1OUT to VBUSOUT1. When SW1OUT drops to 0 V, the relay switch K1 switches so that VBUSINS is connected to VBUSOUT1.

No comparator is used in FIG. 8c since the output of SW1OUT is ordinarily either 5 V or 0V. Whereas, because of current draw, VBUSIN may have a voltage somewhere between 5 V and 0 V so that a comparator is necessary in FIG. 8b to determine whether VBUSIN has sufficient power to power the universal serial bus controller 10. In addition, when SW1OUT powers the downstream ports, /BUSPWR is high. /BUSPWR, which is pin 10 on the universal serial bus controller 10, indicates to the universal serial bus controller 10 that the downstream ports 18 are not bus powered. When the power is switched to VBUSIN, the /BUSPWR goes low indicating that the ports are powered by the bus. As the power availability is currently configured for VBUSIN, VBUSIN is able to support a maximum of four downstream ports; however, depending on additional power availability for VBUSIN, additional ports may be supported downstream. In an alternative embodiment, the primary means for power is obtained from VBUSINS. In this manner, when VBUSIN is unable to maintain sufficient voltage to power the downstream ports 18, the power source is switched to the alternate means of power which in this embodiment is SW1OUT through switching power supply 26A. Thus, depending on the design parameters of the system, the system is designed for maximum reliability.

Figure 8D:
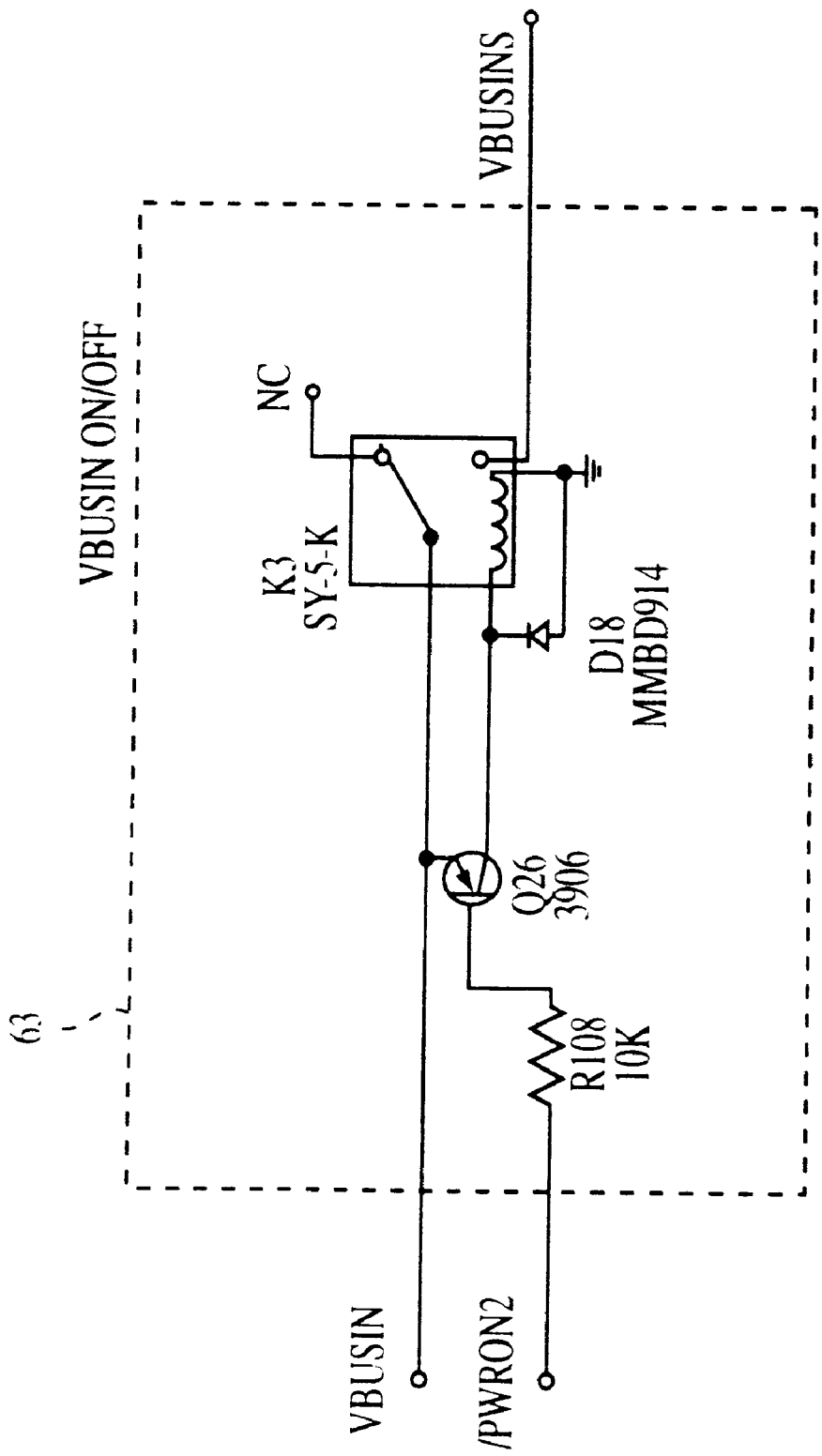

Referring to FIG. 8d, there is shown a circuit diagram for turning off the power source to the downstream ports as shown in FIG. 8a. In the event that the universal serial bus repeater wishes to turn off the power to the downstream ports, the universal serial bus controller 10 sends a signal via the /PWRON2 pin (which provides the same output as the /PWRON pin) to indicate that the power to the downstream ports should be shut off. The /PWRON signal is sent to the switching power supply 26A to shut it off. After the switching power supply 26A is shut off, the circuitry of the VBUSOUT SWITCH 64 would switch the power to VBUSIN. In order to shut down the power to the downstream ports, VBUSIN OFF/ON 63 is used. As shown in FIG. 8d, when the /PWRON2 signal (which is active low) is sent to shut off the power to the downstream ports, relay K3 switches VBUSIN to a no connection so that VBUSINS, the output of VBUS ON/OFF 63, has no power. Otherwise, VBUSINS is equal to VBUSIN. Therefore, when the universal serial bus controller 10 tells the downstream ports to shut off, power from both the switching power supply 26A and the VBUSIN is removed.

Figure 9A:
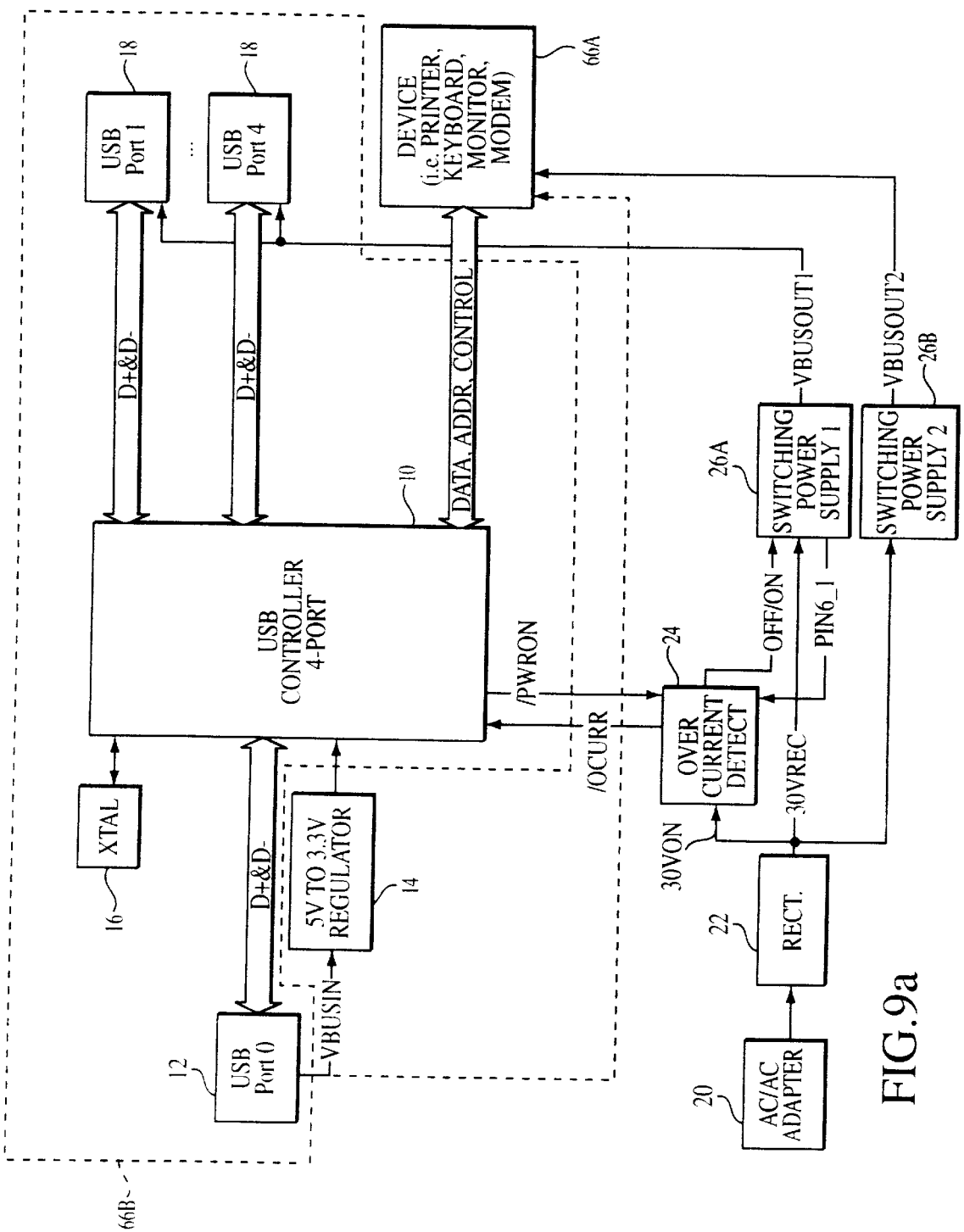
FIG. 9a is a block diagram of an alternative embodiment of a self-powered universal serial bus controller with four downstream ports with one of the downstream ports supporting an embedded devices.

Referring to FIG. 9a, there is shown an alternative embodiment of the universal serial bus repeater. In accordance with this alternative embodiment, the compound universal serial bus repeater 66 includes both a universal serial bus repeater 66B and a universal serial bus device 66A (e.g., printer, keyboard, monitor, mouse, or the like). In this manner, the compound universal serial bus repeater 66 performs both the function of the universal serial bus repeater 66B, as previously described, as well as the functions of a universal serial bus device 66A. The universal serial bus repeater 66B, which includes a universal serial bus controller 10, provides an interface upstream to a USB host or other universal serial bus repeater or downstream to a USB device or a universal serial bus repeater. With this configuration, as an example, rather than buying a universal serial bus monitor and a separate universal serial bus repeater, a compound device, which includes both universal serial bus monitor 66A and a built-in universal serial bus repeater 66B, may be used. In this manner, there are less connectors, less cables, less power supplies necessary for the configuration.

Moreover, the universal serial bus device 66A may be powered by an external power supply, as shown in FIG. 9a as switching power supply 26B, or be powered by VBUSIN, depending on the power requirements of the universal serial bus device 66A. For example, if the universal serial bus device 66A is a monitor, the universal serial bus device 66A is powered by an external power supply. If the universal serial bus device 66A is a keyboard, with lower power requirements, the universal serial bus device 66A may be powered by VBUSIN, as shown by the dotted line in FIG. 9*a*.

Figure 9B:
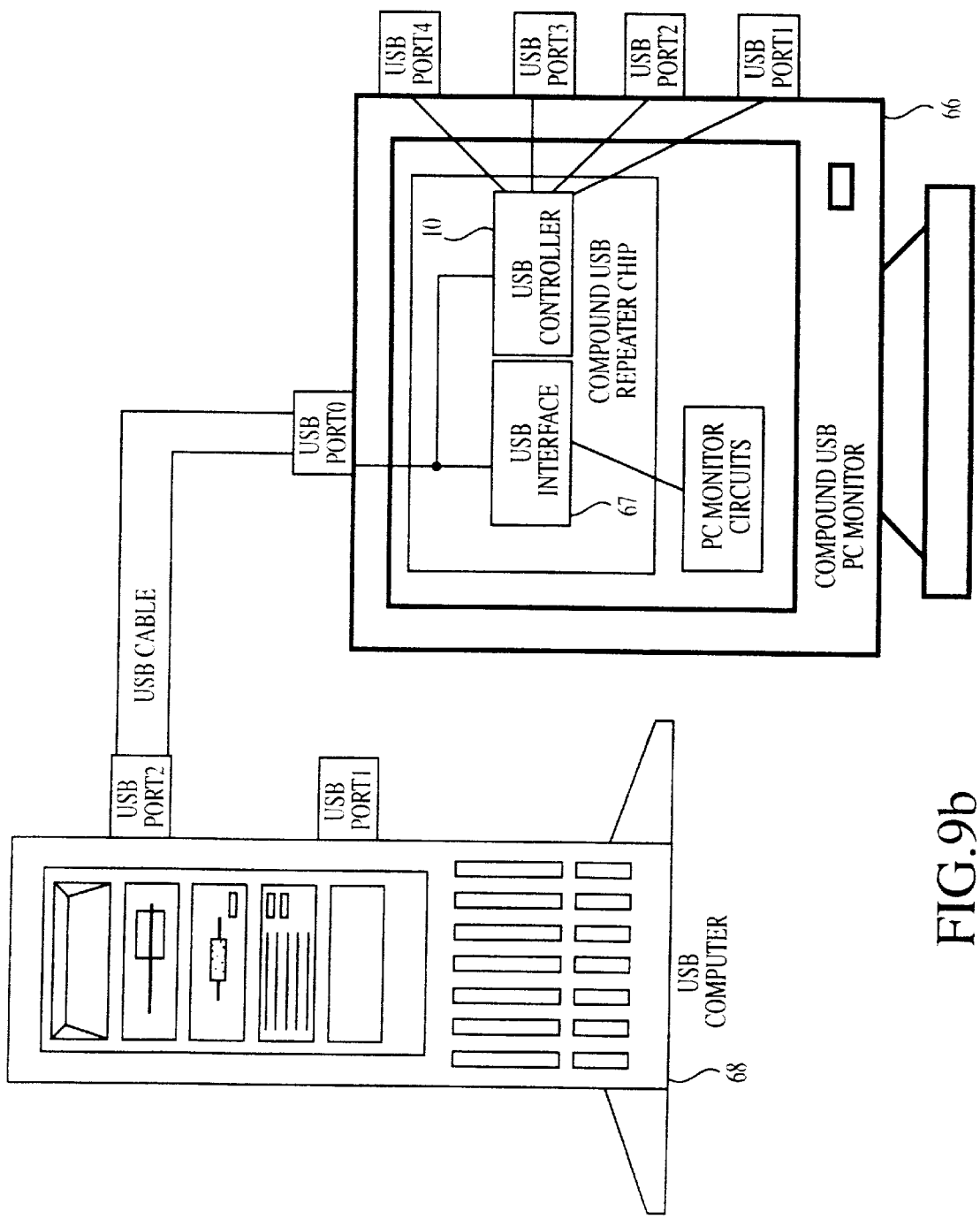

As shown in FIG. 9*b*, the compound universal serial bus repeater 66 includes a universal serial bus controller 10 and a universal serial bus interface 67. An example of a universal serial bus device that performs both functions of a controller and an interface is the Texas Instruments TUSB2140 4-port device with Inter-Integrated Circuit (I2C) bus circuitry. The I2C bus circuitry serves as the universal serial bus interface 67, that can be used to control a PC monitor. The universal serial bus interface 67 (using the Inter-Integrated Circuit (I2C)) allows control of the monitor's brightness, contrast, vertical/horizontal hold as well as other operating characteristics of the monitor. Port0 of the compound universal serial bus repeater 66 is connected to a universal serial bus port of a universal serial bus computer 68. The universal serial bus computer 68 is a standard computer with a universal serial bus port. Further, downstream ports on the compound universal serial bus repeater 66 can be connected to other external devices, such as a mouse and an external video. The external devices, in turn, may be compound universal serial bus devices so that the universal serial bus devices may be daisy-chained together.

From the foregoing detailed description, it will be appreciated that numerous changes and modifications can be made to the aspects of the invention without departure from the true spirit and scope of the invention. This true spirit and scope of the invention is defined by the appended claims, to be interpreted in light of the foregoing specification.

I claim:

1. A fault detect system for a power supply comprising:

a power supply, the power supply having a line which outputs fault status of the power supply, the line also inputting a value to turn the power supply on or off;

a fault detect circuit including a means for determining if there is a fault on the power supply, the means for determining being connected to the line on the power supply, the fault detect circuit further including means for turning the power supply on or off, the means for turning the power supply on or off also being connected to the line on the power supply.

2. A fault detect system as claimed in claim 1 wherein the means for determining if there is a fault on the power supply includes a comparator which compares the fault status on the line with a predetermined value.

3. A fault detect system as claimed in claim 1 wherein the means for turning the power supply on or off includes a switch, the switch being connected to the line on the power supply.

4. A method for determining fault on a power supply comprising the steps of:

sensing a line on the power supply to determine fault status on the power supply;

determining whether there is a fault on the power supply;

turning off the power supply by sending a signal to the power supply on the same line on the power supply.

5. A method as claimed in claim 4 wherein the step of determining whether there is a fault on the power supply includes comparing the value of the fault status on the power supply with a predetermined value.

6. A method as claimed in claim 4 wherein the step of turning off the power supply by sending a signal to the power supply on the same line on the power supply includes using a switch to drive the line on the power supply to a predetermined value.

* * * * *